United States Patent Office 3,267,713
Patented August 23, 1966

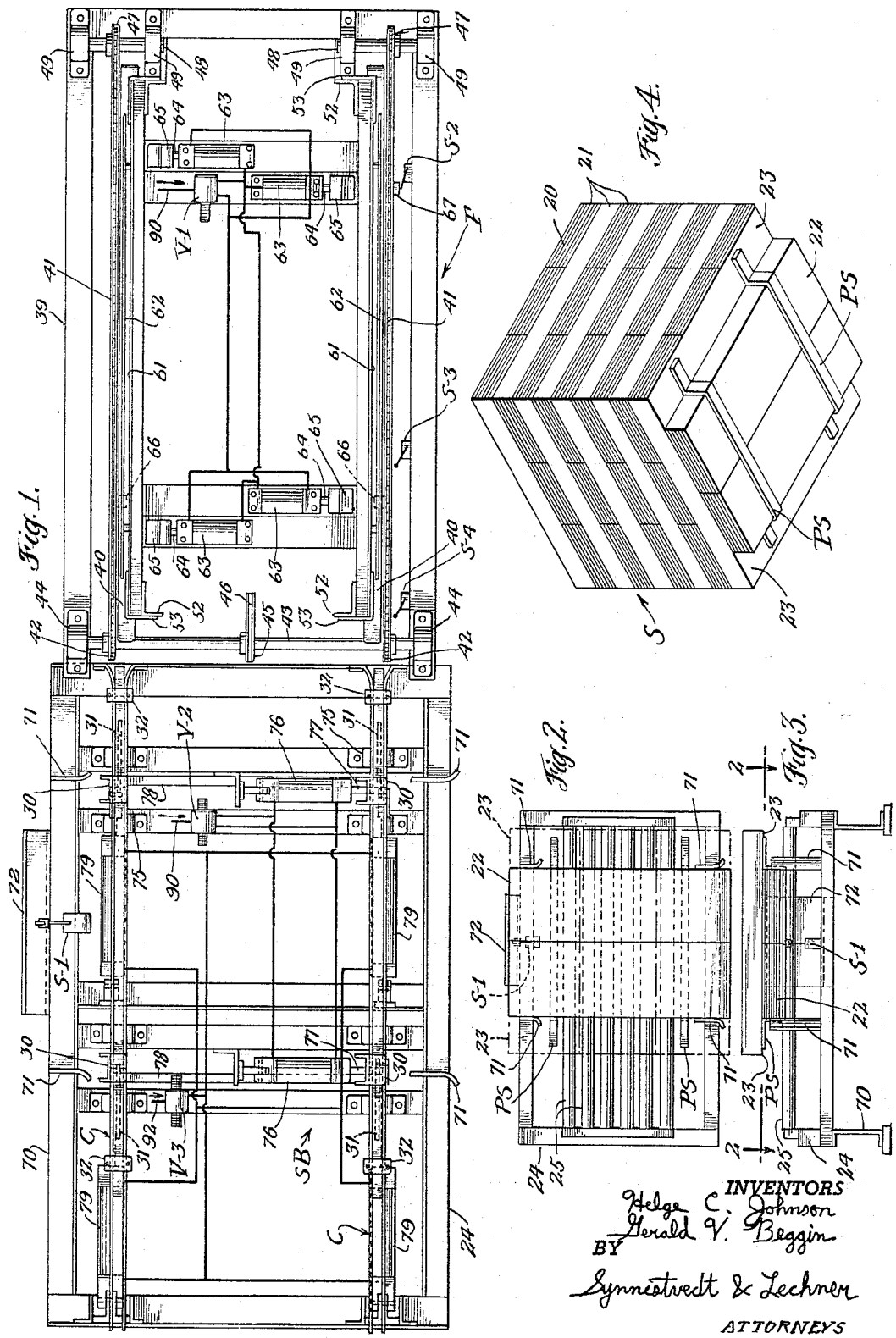

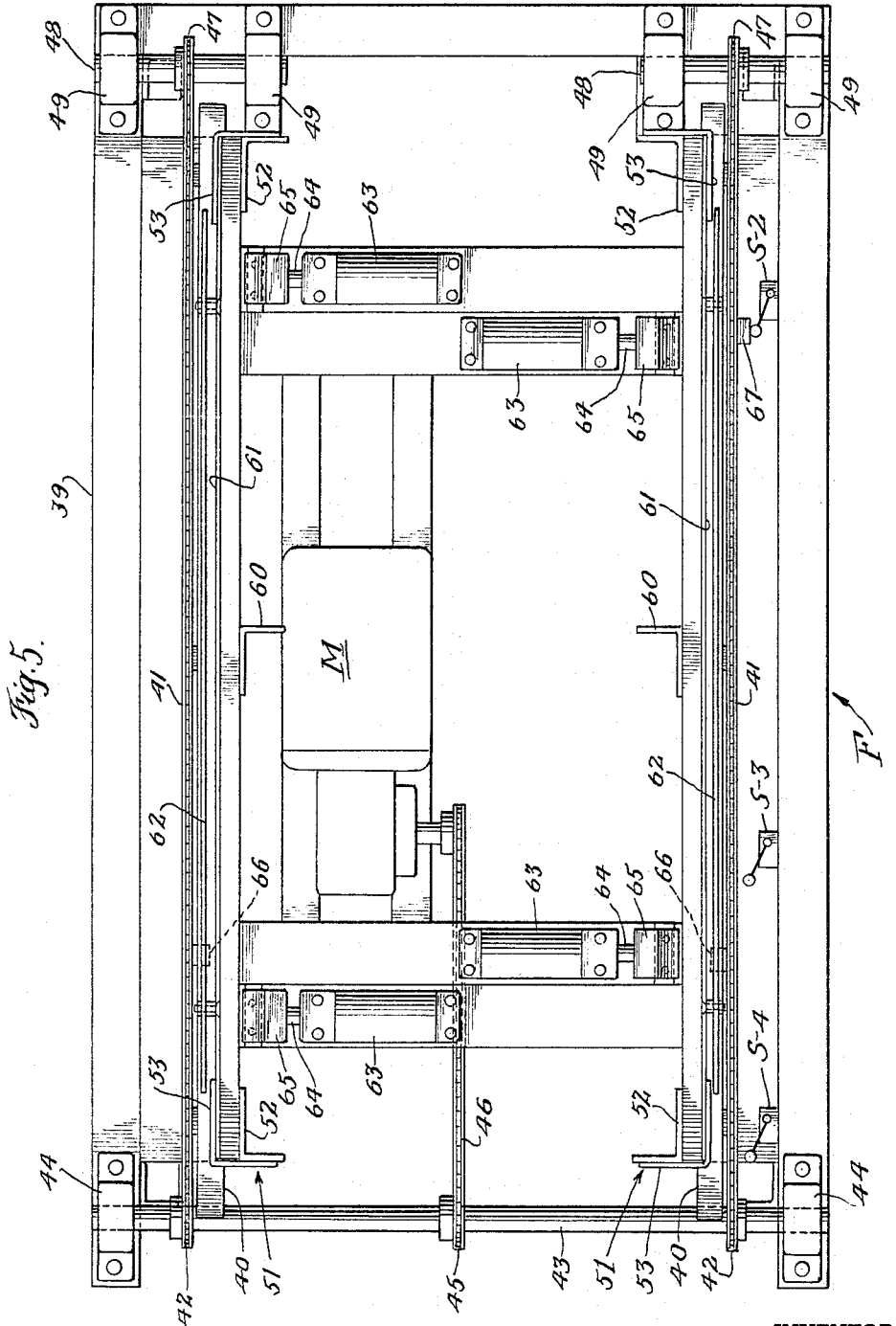

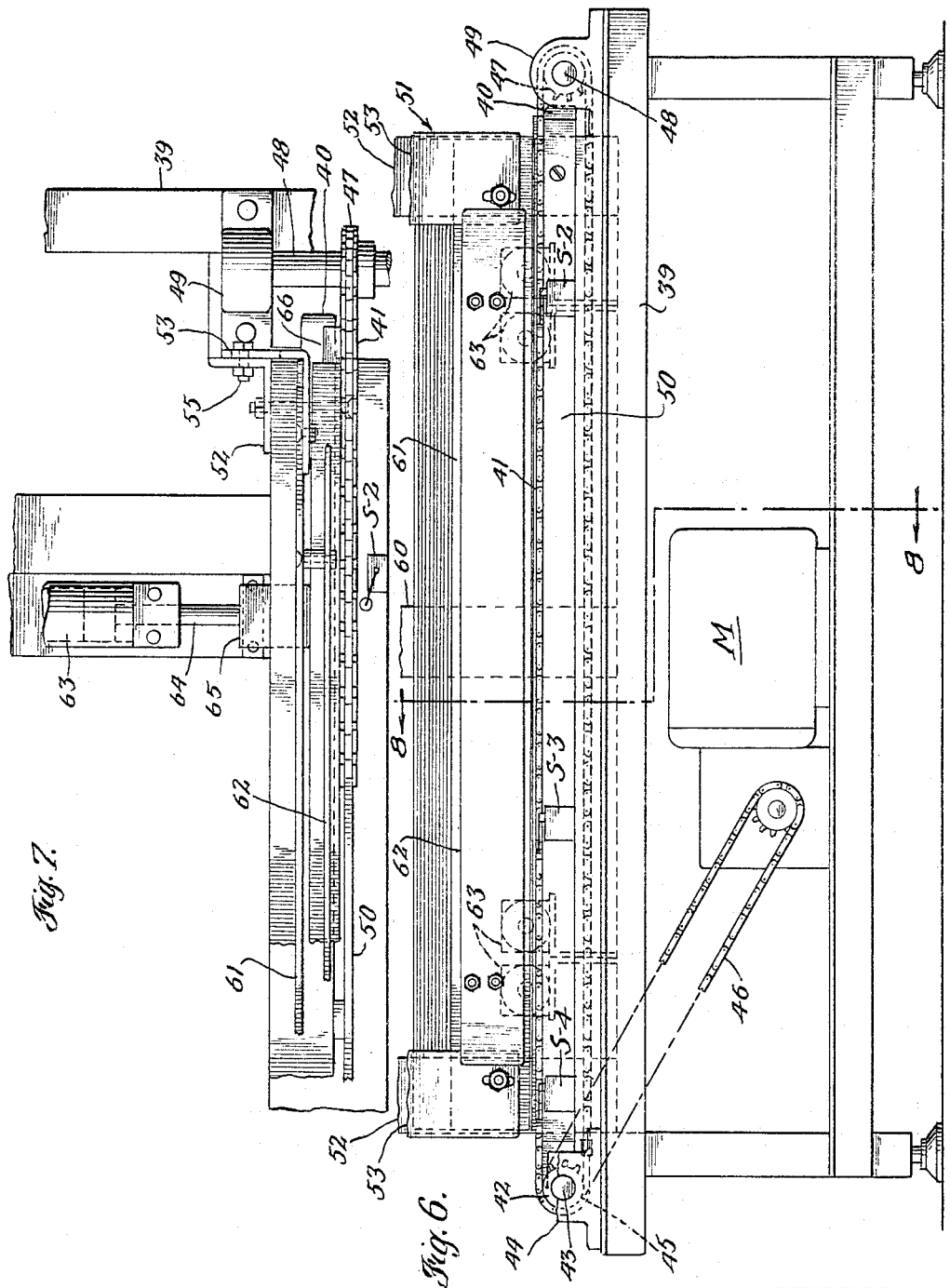

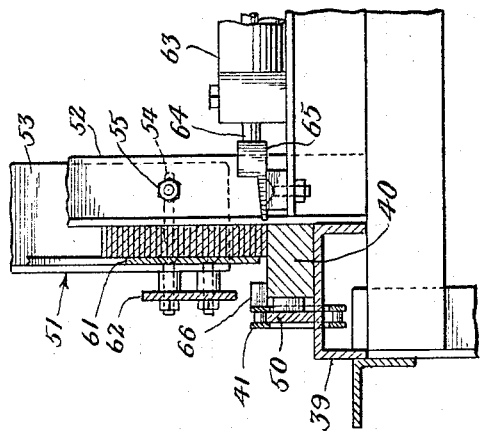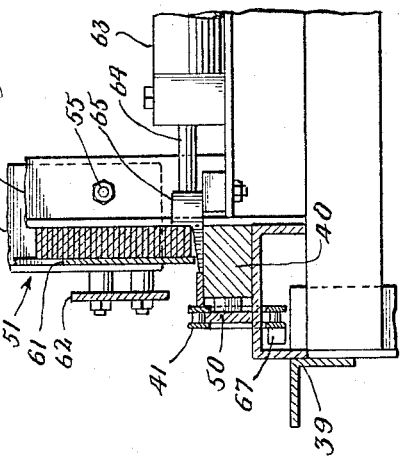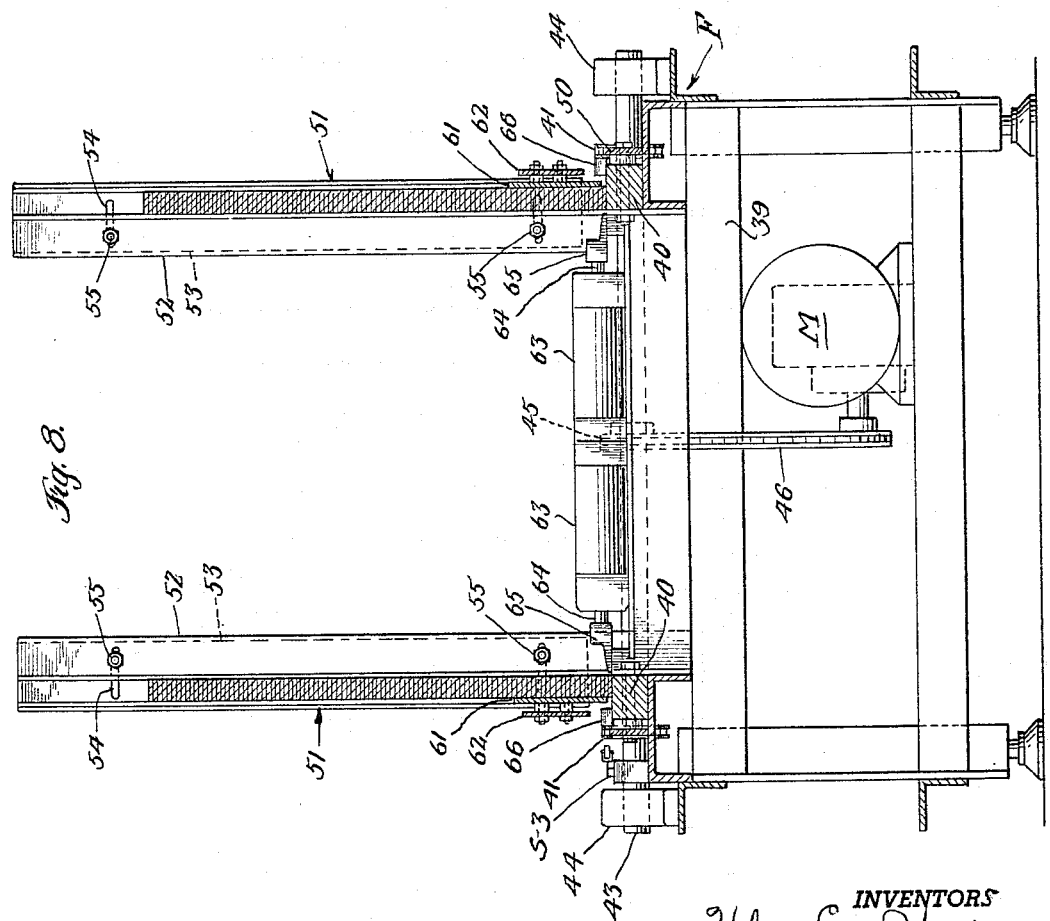

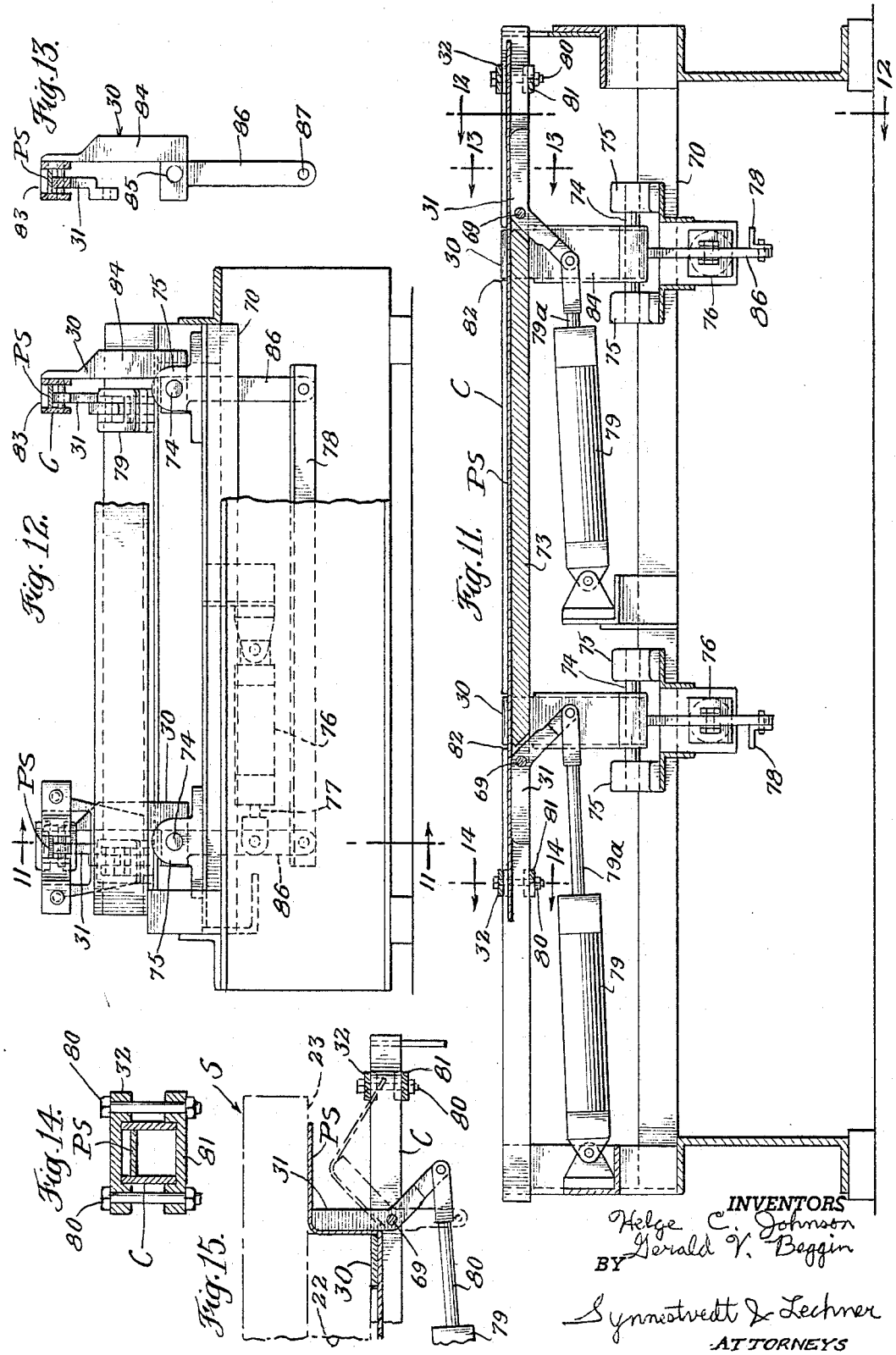

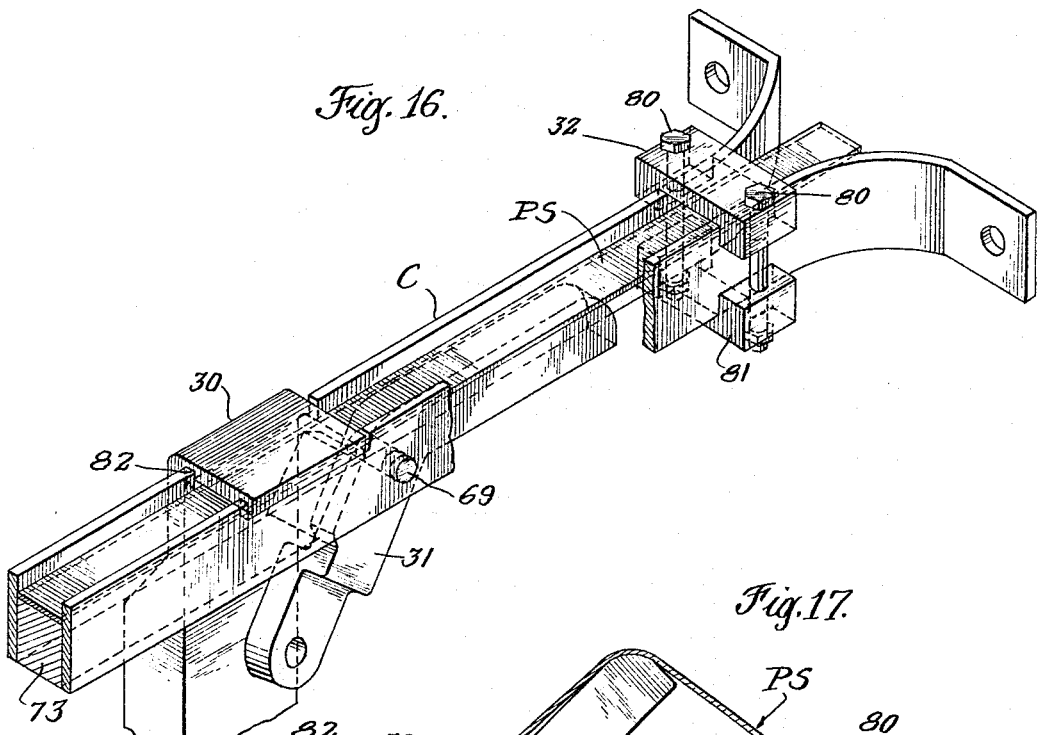
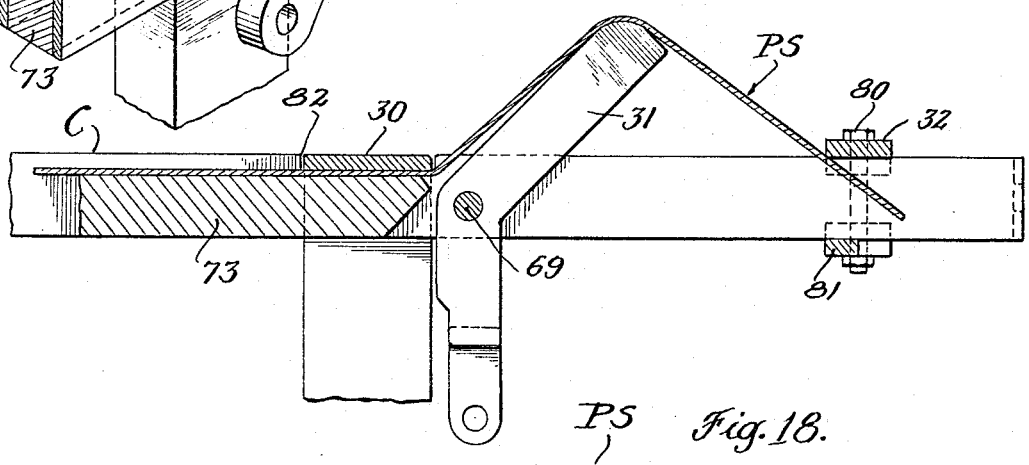
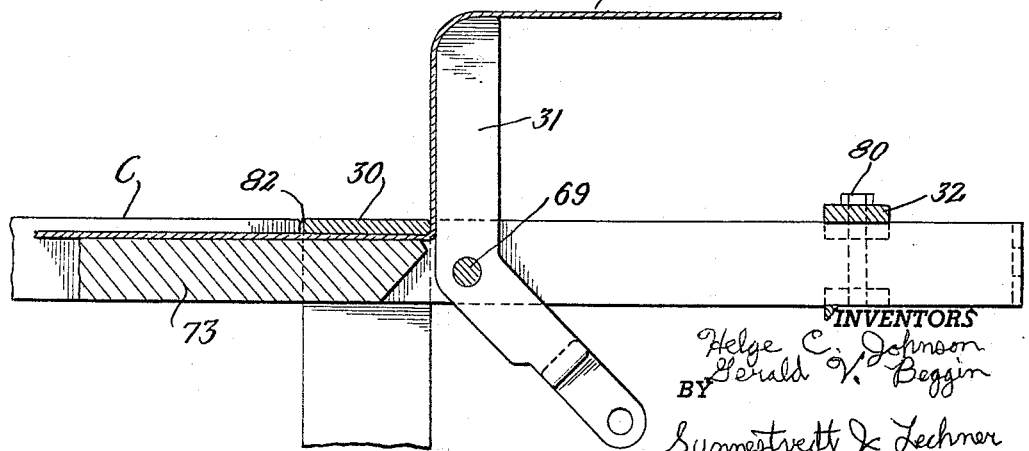

3,267,713
APPARATUS FOR SHAPING STRAPS FOR USE IN THE HANDLING OF STACKS OF GOODS
Helge C. Johnson, West Chester, and Gerald V. Beggin, Philadelphia, Pa., assignors to Certain-Teed Products Corporation, Ardmore, Pa., a corporation of Maryland
Filed Apr. 29, 1963, Ser. No. 276,353
6 Claims. (Cl. 72—297)

This application relates to apparatus for forming and placing pallet straps which are designed for use with stacks of goods. It is particularly concerned with equipment for forming and positioning pallet straps for use under stacks which are to be moved from place to place by means of fork lift trucks or similar warehouse equipment.

In modern warehouse practice, goods are commonly piled in stacks several layers deep, and such stacks are handled as a unit insofar as movements within the warehouse and to transportation equipment are concerned. One of the more useful pieces of warehouse equipment for handling such stacks is the fork lift truck. These trucks lift and carry stacks by means of tines, ordinarily two on a given truck, which are placed under the stack.

The stacks are generally placed on small wooden platforms called pallets in order to facilitate handling of the stack by the fork of the lift truck. While some types of packages or bundles are so fragile or weak that a stack formed therefrom would be damaged during handling operations unless it was supported by a pallet, other types of goods form stacks which are strong enough to be handled without the use of a separate pallet. However, even with the latter type of goods, pallets are commonly used because they hold the stack far enough from the floor so that the tines of the lift truck can be placed under it, for example by inserting the tines underneath the top surface of the pallet or into slots specially provided for this purpose.

The pallets themselves present certain disadvantages. The space they occupy in a warehouse or transportation vehicle represents wasted storage capacity. In addition, they must be inventoried, handled and repaired. Since they are usually constructed by hand, they are relatively expensive.

The present invention is concerned with equipment for preparing a stack of goods for handling by fork lift trucks, but which permits the elimination of the wooden pallets, and thus the elimination of the several disadvantages outlined above. Briefly, this is accomplished according to the invention by arranging the stack in a certain way, and by placing beneath it bent iron straps which serve to maintain the stack in its unitary configuration during handling thereof by a fork lift truck. The straps are inexpensive and expendable, so they may be employed on a single use basis. Thus there is no need to maintain a large inventory or to repair them, as is the case with pallets. Since they need not be returned to the warehouse, they can accompany the stack in a transportation vehicle to its point of use where they can be disposed of. These straps are termed here "pallet straps" since they replace the common wooden pallet. In the discussion which follows, the invention is described with particular reference to equipment for use with stacks formed of bundles of roofing shingles. Hence, the stack will often be called a "bundle stack." It should be kept in mind, however, that the invention may be employed with stacks of packages which are not, strictly speaking, formed of bundles.

It is an object of this invention to provide apparatus for forming pallet straps for use under a bundle stack, especially a stack of the type having a base layer and upper layers overhanging the sides of said base layer.

Another object of this invention is the provision of equipment for positioning and shaping pallet straps to fit a bundle stack after the stack has been formed.

A further object of the invention is to provide equipment for automatically applying pallet straps to stacks.

It is an object of this invention to provide equipment for bending a strap by applying a double bend thereto in a region near the end thereof in a single operation.

A further object of the invention is to provide equipment for storing pallet strap blanks, feeding them to a strap station for forming and application to a stack, and for carrying out the feeding and forming operations completely automatically.

The above objects and purposes together with others may be more readily understood by considering the detailed description which follows together with the accompanying drawings in which:

FIGURE 1 is a more or less diagrammatic plan view of pallet strap shaping apparatus constructed in accordance with the invention, including strap bending equipment and mechanism for feeding strap blanks thereto;

FIGURE 2 is a diagrammatic plan view on a reduced scale of a conveyor table on which bending equipment shown in FIGURE 1 is mounted, the view being taken as indicated by the line 2—2 of FIGURE 3;

FIGURE 3 is a front elevational view of FIGURE 2;

FIGURE 4 is an isometric view of a stack of bundles with pallet straps applied thereto, the view being taken from generally below the stack;

FIGURE 5 is a plan view of the feeding mechanism, on an enlarged scale as compared with FIGURE 1;

FIGURE 6 is a front elevational view of the feeding mechanism of FIGURE 5;

FIGURE 7 is a fragmentary plan view, on an enlarged scale of the right front portion of the apparatus in FIGURE 6;

FIGURE 8 is a cross section of the feeding mechanism taken on the line 8—8 of FIGURE 6;

FIGURE 9 is a fragmentary view on an enlarged scale of a portion of the equipment shown in FIGURE 8;

FIGURE 10 is a view similar to FIGURE 9, but showing another stage in the operation of the feeding mechanism;

FIGURE 11 is a sectional elevational view of the bending equipment shown in FIGURE 1, on a larger scale, the view being taken approximately on the line 11—11 of FIGURE 12;

FIGURE 12 is in part an end view and in part a sectional view taken on the line 12—12 of FIGURE 11;

FIGURE 13 is a detail view of a clamp forming part of the bending equipment, the view being taken on line 13—13 of FIGURE 11;

FIGURE 14 is an enlarged cross sectional view showing a guide forming a part of the bending equipment, the view being taken on line 14—14 of FIGURE 11;

FIGURE 15 is a detail view of a portion of the bending apparatus shown in FIGURE 11, with a bending lever shown in one position in full lines, and in another position in dotted lines;

FIGURE 16 is an enlarged isometric view of a portion of the bending equipment including a strap channel with a strap blank positioned therein, a clamp, a bending lever, and a bending guide;

FIGURE 17 is a fragmentary sectional view showing the strap bending lever part way through the operation of bending one end of a strap; and FIGURE 18 is a view similar to FIGURE 17 showing the bending lever in its position at the end of a strap bending operation.

General description

Attention is first directed to FIGURE 4. In that figure a bundle stack is indicated at S, and it can be seen that it is made up of a plurality of bundles 20 stacked in layers 21. The bundles in adjacent layers are oriented differently, as shown in FIGURE 2, and form an interlocking stack structure which has strength and stability. The bottom layer 22 of the stack is formed of only two bundles, as contrasted with the remaining layers which consist of three bundles. Hence, the upper layers overhang the lower layer on each side, the overhang being indicated at 23. A stack arranged in this way has two notches or passageways into which the tines of a fork lift truck can be inserted, for the purpose of lifting and carrying the stack. The tines are placed under the overhanging second layer of the stack on each side of the bottom layer and bear against the second layer when they lift the stack. However, the tines do not directly lift the two bundles forming the bottom layer of the stack, and unless this layer is held against the second layer in some fashion, the bottom bundles will be left behind when the fork lift carries off the stack. Of course, if the bottom layer is left behind, the notch formed by it and the overhanging upper layer is destroyed, and the stack will be difficult to lift without the aid of a pallet the next time it becomes necessary to move it.

In FIGURE 4 there are shown two straps PS which are applied to the stack to insure that the bottom layer will be held against the remainder of the stack when it is lifted by a fork lift truck. The straps PS extend beneath the bottom layer of the stack, and on each side are bent first upwardly around the side of the bottom layer and then outwardly to fit against the overhanging portion of the second layer of the stack. When the tines of the lift truck move upwardly against the overhang of the stack, they will bear not only against the second layer, but against the wing or end portions of the straps.

The equipment shown in the remainder of the figures represents an embodiment of the invention for applying two straps such as PS to a stack of the kind illustrated in FIGURE 4. Before a detailed description is given of the various parts of the apparatus, the equipment and its operation will be outlined briefly for purposes of orientation.

FIGURE 2 shows a conveyor table 24 having on it stack supporting rollers 25. In this figure the bottom layer 22 of the stack is shown in full lines, while the overhanging upper layers are shown in dotted outline. In the elevational view of FIGURE 3, the bottom layer 22 of the stack can be seen resting on rollers 25, and the second layer is shown on top of the bottom layer. The conveyor table 24 carries the stack bending equipment on it. In FIGURE 1 this equipment is designated generally as SB. The left-hand portion of FIGURE 1 is substantially the same as FIGURE 2 except that the rollers 25 have been removed in order to show the equipment located beneath them.

In the right-hand portion of FIGURE 1 the strap feeding mechanism F is shown. This equipment is mounted generally beside the conveyor table 24 in a position to feed strap blanks to the bending equipment where they are shaped and positioned under a stack.

As was mentioned before, the equipment is designed to place two straps under a stack. The apparatus for handling each strap is substantially the same, so for orientation purposes at least, attention can be concentrated on the apparatus for a single strap. A channel C is provided on the surface of the conveyor table 24, for the purpose of holding a strap blank beneath a stack located on the table. A pair of clamps 30 are mounted on the table for movement over the channel C to a position where they tend to hold down a blank lying in the channel. A pair of bending levers 31 are mounted on table 24 beneath the channel C, toward the edge of the table from, or outboard of, the clamps 30. The bending levers 31 may be pivotally moved upwardly through the channel C. Further outboard on the channel are located bending guides 32 which tend to hold down the blank in the channel.

The bending operation can best be understood by considering FIGURES 15 through 18. In FIGURE 15 it can be seen that the bottom layer 22 of a stack S is so positioned on the support table that clamp 30 is positioned beneath it at the outer edge of the bottom layer. The bending lever 31 is thus positioned generally under the overhang of the stack. Turning now to FIGURE 16, the bending equipment for bending one end of the strap is shown in the starting position. Clamp 30 is located over channel C in a position to hold down strap PS. Bending lever 31 is in its down position beneath the strap. The bending guide 32 is positioned over the strap.

FIGURE 17 shows the equipment part way through the bending operation. Bending lever 31 has been moved upwardly through the channel against strap PS, thus starting to bend it around the edge of clamp 30. Guide 32 is holding down the end portion of strap PS, thus preventing it from moving upwardly as it otherwise would under the influence of lever 31. As a result, a second bend is formed in strap PS, the bend taking place about the end of lever 31. FIGURE 18 shows the equipment at the end of a bending operation. Bending lever 31 has moved through about 90 degrees, and has formed a substantially right angle bend in strap PS at the clamp 30. A second right angle bend, which is not as sharp as the first, has been formed around the end of bending lever 31, and the end of the strap has pulled free of bending guide 32.

Returning now to FIGURE 15, it can be seen that the bent strap extends under the bottom layer 22 of the bundle and has a wing portion extending under the overhang of the stack. After completion of the bending operation, the bending lever is moved back down through the channel, and the clamp 30 is moved away from its position over channel C. When this has been done, a fork lift truck can insert its tines under the overhanging portions of the stack and pick up the stack, including the bottom layer, for transportation to another location.

Feeding mechanism

This portion of the apparatus is shown in FIGURE 1 and FIGURES 5 through 10.

The feeding equipment is positioned beside conveyor table 24, as appears in FIGURE 1, so that strap blanks may be delivered therefrom to the two channels on the delivery table for bending and positioning. The preferred mode of delivery is such that the blanks move lengthwise in a generally horizontal plane from the feeding mechanism F to the channel C. While the equipment is shown in FIGURE 1 with the feeding mechanism located to the right of the conveyor table, it may be located on the other side if this is convenient.

In the feeding apparatus F, there are provided two feeding surfaces 40, one of which is generally aligned with each of the two channels C on the conveyor table. The feeding surfaces, together with the other equipment of the feeding mechanism are carried on a frame 39. The strap blank to be fed rests on the feeding surface. On one side of the feeding surface, preferably the outboard side, is a chain 41 arranged so that its upper run extends along the surface 40. One such chain is provided for each of the feeding surfaces. The chains are mounted on sprockets 42 at the end of the feeding equipment closer to the conveyor table, and the sprockets 42 are in turn mounted on a shaft 43 carried in bearings 44. Shaft 43 also carries a drive sprocket 45 connected by a transmission chain 46 to motor M. At the other end of the frame 39 the chains are mounted on sprockets 47 which in turn are mounted on short shafts 48 carried in bearings 49. The upper run of the chain rides on a guide rail 50, appearing in FIGURE 6, mounted on frame 39 so that the chain will not be readily displaced laterally. With this arrangement, the chain 41 forms a side wall running along one edge of the feeding surface 40. At appropriate times the motor M is operated to move the chain so that the upper run thereof moves to the left as illustrated in FIGURES 1, 5 and 6.

The chains 41 are each provided with a pusher lug 66 as shown in FIGURES 5, 8 and 9. The lug protrudes across the feeding surface 40 in a position to engage and, when the motor is operating, to advance a strap blank lying on said surface. The pusher lugs on the two chains are preferably aligned with each other. One of the chains is also provided with a control lug 67 which protrudes from the chain on the side away from the feeding surface 40. In the preferred embodiment, the control lug is spaced from the pusher lug 66 one-half of the circumference of the chain, or 180 degrees. A series of control switches S–2, S–3 and S–4 are mounted on frame 39 so that their operating arms extend into the path of travel of the control lug 67. The function of these switches will be described later herein, but it can be pointed out now that they control the operation of the bending equipment SB.

Two pallet blank storage magazines designated generally as 51 are mounted on frame 39, one being provided for each of the feeding surfaces. The magazines are preferably located on the side of the feeding surface opposite that occupied by the chain. The magazine is adapted to hold a stack of unbent pallet straps in position for delivery to the feeding surface from which they are ultimately delivered to the bending apparatus. Inasmuch as it may be desirable from time to time to use straps of different widths, the magazine is made adjustable in width. Upright angle iron 52 is fixed to frame 39, and upright adjustable angle iron 53 is in nested relation therewith, the degree of nesting being determined by the width of the pallet strap and being set by means of the slots 54 in the adjustable angles 53 and the bolts 55 passing through holes in the fixed angles 52. The adjustable feature just mentioned may best be understood by considering FIGURES 5 and 8. As can be seen on FIGURE 5, nesting angle iron supports are provided at each end of the magazine. An additional supporting angle iron 60 is mounted on the frame 39 approximately at the center of the magazine. Near the bottom of the magazine, on the side thereof which is closest to the feeding surface, there is mounted a shear plate 61 which is attached to the adjustable angle irons 53 at each end. As can be seen in FIGURE 6, the angle irons are slotted so that the vertical clearance between the shear plate and the feeding surface may be adjusted. In this way provision is made for accommodation of straps of varying thickness.

The hold down bar 62 is secured to the shear plate 61, and extends outwardly over the feeding surface. The pallet straps are ordinarily formed of black iron, and are not precision made items. Because of this, on occasion imperfections in the strap may cause it to bind or stick as it moves along the feeding surface 40, and when this happens the strap sometimes bows upwardly. The function of the hold down bar 62 is to prevent the strap from jumping off the surface 40 altogether by forcing it down when it bows.

For each of the magazines there are provided two cylinders 63 having piston rods 64. The cylinders are mounted on frame 39 on the side of the magazine away from the supporting surface 40, and are preferably spaced from each other along the magazine an appreciable distance. On the ends of the piston rods 64 are mounted pusher elements or wedges 65. As will be explained later, the cylinders are preferably air actuated, although if desired a hydraulic system may be used.

A unified description of the operation will be given after the remainder of the equipment and the controls therefor are described, but with the above description in hand, the operation of the feeding mechanism per se can be outlined here. For this purpose attention is directed to FIGURES 9 and 10.

In FIGURE 9 no pallet blank is positioned on feeding surface 40. A stack of such blanks is located in the magazine, and the bottommost of these blanks is below the bottom edge of shear plate 61. The control system operates the piston of cylinders 63 to advance wedges 65 to the left against the bottommost blank in the magazine. As shown in FIGURE 10, the wedge pushes this blank out of the magazine onto feeding surface 40, and at the same time the upper surface of the wedge supports the remaining blanks in the magazine. The blank which is pushed out is restrained from moving too far laterally by chain 41, which, it will be remembered, is mounted on rail 50. Chain 41 then moves, and pusher lug 66, which is shown in FIGURE 9, engages the back end of the blank lying on feeding surface 40 and urges it to the left in FIGURES 5 and 6. The blank thus moves lengthwise along the feeding surface and into the channel shown in FIGURE 1. Pushing lug 66 ultimately passes around sprocket 42, and returns to the right end of the feeding mechanism on the bottom run of the chain. As it does so, the control lug 67 moves along the top run of the chain and serially operates switches S–2, S–3 and S–4.

*Bending apparatus*

From FIGURE 1 it can be seen that the bending apparatus is mounted on the conveyor table 24 on the frame 70 thereof and that the apparatus includes two substantially similar units, one for bending each strap. Also mounted on the frame 70 of the conveyor table are guides 71 which assist in properly positioning a stack moving onto the conveyor table from the bottom as seen in FIGURE 1. The conveyor table is also provided with a back stop 72 for limiting the travel of a stack therealong. As can be seen from FIGURE 3, the back stop is necessarily narrower than the space between the tines of a fork lift truck, and is relatively short so that a truck will not have to lift the stack very high in order to clear the back stop.

FIGURE 1 shows the bending apparatus in plan view while FIGURES 11 and 12 show it in front elevational and end elevational views respectively. Attention is now directed to these figures. Each unit of the bender has a channel C as mentioned previously. The channel is flared somewhat at the end near the feeding mechanism, as appears in FIGURES 1 and 16. The central portion of the channel has a floor 73 on which a pallet strap PS located in the channel is supported. The beforementioned clamps 30 are mounted on the frame 70 by means of shafts 74 and bearings 75. The clamps are positioned near the ends of floor 73. As can be seen in FIGURE 12, the pivotal mounting of the clamps allows them to swing up and over the channel C in an arc generally at right angles to the channel. When the clamps swing away from a position over the channel, they move beneath the surface of the conveyor table.

It should be noted that the channel C is provided with notches 82 on the upper edge of the sides of the channel in order to accommodate the clamps. The clamp is shown in greater detail, and separated from the supporting structure, in FIGURE 13. In this figure it can be seen that the clamp has a lip 83 which protrudes over the channel at the notches, an upper leg 84 between the lip and the bore 85 for the pivot shaft 74 and a lower leg 86 having at its end a hole 87 for mounting of the tie bar 78.

Air actuated cylinders 76 are provided for moving the clamps into and out of position. As can be seen in FIGURE 12, the cylinder 76 is pivotally fixed to the frame 70, and its piston rod 77 is attached to the clamp 30 below the pivot mounting of the clamp. In the embodiment shown in FIGURE 12, a single cylinder serves one clamp of each of the two bending units. This is accomplished by ganging the clamps by means of tie bar 78 which is pivotally mounted on the bottom ends of the two clamps. Actuation of cylinder 76 in a sense to force the piston rod out of the cylinder will move both the clamps out of their clamping position and below the surface of the table. On the other hand, actuation of cylinder 76 in a sense to force the piston rod into the cylinder will move the clamps up to and over the channel C. Thus far, the operating mechanism for only one pair of clamps has been discussed, but a consideration of FIGURES 1 and 11 will show that the operating mechanism for the other pair of clamps is substantially the same.

As shown in FIGURE 11, the bending levers 31 are mounted just outboard of the clamps 30 at each end of the channel C. They are mounted by means of pivot shafts 69 which are journaled into the side walls of the channel. When the bending lever is in its down position, the top surface, in effect, forms a continuation of channel floor 73.

The lever actuating apparatus consists of an air actuated cylinder 79 which is pivotally mounted on frame 70. The piston rod 79a is pivotally connected to the bottom end of the bending lever 31. Considering the right-hand cylinder 79 in FIGURE 11 for example, it can be seen that movement of the piston rod 79a, in a sense to force it out of the cylinder 79, will result in the upper end of the bending lever being moved upwardly through the channel C. Movement of the piston rod into the cylinder will swing the bending lever back to a horizontal position. It should be noted, however, that the left-hand cylinder and piston rod work in the opposite manner. That is to say, movement of the piston rod into that cylinder will move the bending lever up through the channel. As can be seen from FIGURE 1, one cylinder and piston unit is provided for each of the bending levers.

The bending lever is configured with respect to the channel and to the actuating cylinder and piston so that it completely clears the floor 73 of the channel and presents a flat upwardly facing surface when it is in its down position. As shown in FIGURE 15, in its up position, the lever forms substantially a right angle with the channel. The upper or outer end of the lever has a curved surface so that the strap as it is bent around this end of the lever will curve gradually rather than sharply. The sharp right angle "outside" bend at the bottom of the stack, and the curved "inside" bend at the wing of the stack, are each less likely, by reason of their shape, to damage packages by digging into them than would bends of other shapes in those locations.

On each of the channels C there are mounted two bending guides 32. These guides are positioned outboard of the bending levers 31, and in particular are located beyond the path of travel of the end of the bending lever. As can be seen in FIGURE 14, the bending guide extends completely across the top of the channel C so it will restrain the upward movement of the strap PS. The guide may be attached to the channel in any suitable way, such as by means of bolts 80 and bottom plate 81. Although the guide may be made movable to and from a position over the channel, in a manner similar to the clamps 30 discussed above, this is not necessary since the strap clears the guide completely after it has been shaped and positioned under the stack. The position of the guide on the channel with respect to the bending lever may readily be determined experimentally. Among the considerations involved in such positioning are following: It is desired that the guide hold the strap until the bend around the end of the bending lever is completely formed. It is also desired that the guide release the end of the strap as the bending lever moves to its final vertical position, that is, as the bending lever completes the bend formed at the clamp 30. As an example, it has been found that to form a strap having a wing portion about 1½ inches long, the guide should be positioned about 1⅝ inches outboard of the end of the bending lever, when said lever is in the down position.

Control equipment

The equipment for controlling the operation of the feeding apparatus and the bending apparatus may best be understood by considering FIGURE 1 where the control elements and most of the controlled equipment are shown somewhat diagrammatically. It will be remembered that the elements to be controlled include chain drive motor M (which does not appear on FIGURE 1), air cylinders 63, which operate the magazine delivery system, air cylinders 76, which operate the clamps, and air cylinders 79, which operate the bending levers.

Valve V-1 controls the operation of the four magazine cylinders 63. As can be seen from the air lines diagrammatically indicated on FIGURE 1, valve V-1 directs air supplied at the inlet 90 alternately to the back and front faces of the pistons in the cylinders. The valve is solenoid controlled and has a spring return such that air is normally supplied to the front faces of the pistons so the wedges 65 are normally held in retracted position.

Valve V-2 on the strap bending apparatus is a solenoid controlled double throw valve. It is arranged to direct air from the inlet 91 alternately to the face or back of the pistons located in the two clamp control cylinders 76. A consideration of the air lines diagrammatically shown on FIGURE 1 will make this arrangement clear.

Valve V-3, like V-2, is a double throw solenoid controlled valve which directs air alternately from inlet line 92 to the faces or backs of the pistons located in the four bending lever control pistons 79.

In addition to the three switches S-2, S-3 and S-4, located adjacent one chain of the feed mechanism, there is provided an additional switch S-1 on conveyor table 24. This switch is mounted near the back stop 72 at a position so that its operating arm will be contacted by the bottom layer of a stack.

Summary of operation

With the above description of the apparatus and control equipment in mind, the over-all operation may be summarized with particular emphasis being placed on the function of the control system.

Stacks to which the pallet straps are to be applied may be formed by automatic or semi-automatic equipment not shown herein, or may be built up by hand, if desired. The stacks, once they are formed, enter the equipment shown in FIGURE 1, by moving along a conveyor or roller table to a point where they enter the conveyor table 24. The stack moves across the conveyor table 24 until it is restrained by the back stop 72. Thus the stack will then occupy a position substantially as shown in FIGURE 2. As the stack approaches the back stop in the above maneuver, it contacts and closes switch S-1. This starts motor M and the chains begin to move.

The pushing lugs on the chains each engage a blank lying on the feeding surfaces 40 of the feed mechanism. As the chains move, these blanks are fed into the two channels C on the conveyor table. When the pusher lugs on the chains reach the left-hand sprockets of the feed mechanism they pass down and onto the lower run of the chain. The control lug on one of the chains (the bottom chain in FIGURE 1) appears at the right-hand end of the upper run of the chain. The motor continues to operate, thus moving control lug 67 to the left in FIGURE 1 after the straps have been delivered to the channels. As the control lug moves to the left it operates switch S-2. This switch activates one solenoid of valve V-2 to set that valve to deliver air to clamping cylinders 76 in a sense to force the piston rods into the cylinders. Thus cylinders 76 move the clamp up and over the channels.

Control lug 67 continues to the left in FIGURE 1 and in its travel closes switch S-3. This switch energizes one solenoid of valve V-3 to deliver air to the four bending lever cylinders 79 in a sense to force the piston rods into the left-hand pair of cylinders, and out of the right-hand pair of cylinders. Thus the bending levers are operated to swing up through the channels C. Each bending lever places a relatively sharp right angle bend in a strap PS at clamp 30, and forms a gentle right angle bend around the end of the lever by cooperating with guide 32. These steps have been discussed earlier and appear in FIGURES 16 through 18.

After passing switch S-3, the control lug moves to the left to close switch S-4. This switch actuates the solenoid on valve V-1 to deliver air to the magazine pistons 63 in a sense to move wedges 65 toward the magazines, thus delivering the bottommost strap in the magazine to the feeding surface 40. These steps have been discussed above and are illustrated in FIGURES 9 and 10. Closure of this switch also operates solenoids on valve V-2 and valve V-3 to reverse the air supplied to cylinders 76 and 79 respectively. In this way the bending levers are retracted to their down position, and the clamps are moved from over the channels to their down positions.

As control lug 67 moves past switch S-4, it reopens it, thus deenergizing the solenoid on valve V-1 and a spring return in that valve shifts the air applied to magazine cylinders 63 to withdraw the wedges 65. As the wedges withdraw, the stack of blanks in the magazine drops slightly to place a new blank in the bottommost position. In addition, when switch S-4 opens, motor M is turned off. Since the pusher lug and the control lug are mounted 180° apart, the chains stop with the pusher lugs 66 located near the right-hand sprockets of the two chain drives, where they must move only a short distance to come into pushing contact with the newly delivered blanks on the feeding surfaces 40 the next time the equipment is operated.

Inasmuch as the bending levers and clamps have been moved out of the way, a vertical fork lift truck can approach the conveyor table from the top as shown in FIGURE 1 and insert its tines beneath the overhanging second layer of the stack and the wings of the bent straps. The truck can then lift the stack a few inches to clear the back stop 72, and back away, carrying the stack with it.

We claim:

1. Apparatus for positioning and shaping a pallet strap for use under a bundle stack of the type having a base layer and upper layers overhanging the sides of said base layer, comprising a conveyor table adapted to support a stack thereon with its overhanging portions oriented toward opposite sides of said table, a strap channel on the surface of said table extending under the base layer of said stack and under the overhanging portions thereof, for holding a strap beneath said stack, a pair of of clamps positioned on said table beneath said base layer, one at each edge thereof, said clamps each being movable between first position beneath said base layer but away from said channel, and a second position over said channel and a strap therein but beneath said base layer at the edge thereof, a pair of bending levers pivotally mounted on said table beneath said channel outboard of said base layer of said stack, said levers being pivotally movable upwardly through said channel toward said base layer, and a pair of bending guides mounted over said channel, one positioned outboard of each of said levers to resist upward movement of the ends of said strap under the influence of said levers.

2. Apparatus for positioning and shaping a pallet strap beneath a bundle stack of the type having a base layer and overhanging upper layers comprising, a conveyor table for supporting said bundle stack, a strap channel on the surface of said conveyor table extending thereacross for holding a strap beneath said stack, power operated bending levers beneath said channel, said levers being movable upwardly against a strap in said channel to bend it upwardly and around the edges of the base layer of said stack, bending guides on said channel outboard of said levers for forming wings on said strap, feed mechanism aligned with said channel at one end thereof for serially feeding strap blanks thereto, a storage magazine adjacent said feed mechanism adapted to hold a plurality of strap blanks, discharge means adjacent said magazine for serially delivering strap blanks from the magazine to the feed mechanism, control mechanism operated by said feed mechanism for actuating said levers and said discharge means, and sensing means on said conveyor table positioned to detect the presence of a stack thereon, said sensing means being interconnected with said feed mechanism for initiating operation thereof.

3. Apparatus for feeding pallet straps to a strapping station comprising a feeding surface adjacent said strapping station and in alignment therewith, for holding a pallet strap blank to be fed to said station, a feed chain positioned beside said surface and extending therealong, said chain carrying a pusher lug protruding across said surface in a position to engage a strap blank thereon, a strap blank storage magazine positioned beside said surface on the side thereof opposite said chain, said magazine being adapted to hold a stack of strap blanks, and a strap blank pusher adjacent said magazine having an element engageable with the bottommost blank in the magazine to push it onto said feeding surface.

4. Apparatus for positioning and shaping a pallet strap beneath a bundle stack of the type having a base layer and overhanging upper layers, comprising a conveyor table for supporting said bundle stack, a strap channel on the surface of said conveyor table extending thereacross for holding a strap beneath said stack, power operated bending levers beneath said channel, said levers being movable upwardly against a strap in said channel to bend it upwardly and around the edges of the base layer of said stack, and bending guides mounted on and extending over said channel adjacent and outboard of said levers, said guides being positioned to resist upward movement of the ends of said strap under the influence of said levers, whereby to bend the end portions of said strap outwardly around the ends of said levers as the levers bend the strap upwardly to fit said end portions against the bottom of the overhanging upper layers of said stack.

5. Apparatus for positioning and shaping a pallet strap beneath a bundle stack comprising a strapping station whereat said strap is positioned under and shaped to fit said stack, said station having power actuated strap shaping elements, a feeding mechanism adjacent said strapping station and in alignment therewith comprising a feeding surface for supporting a strap being fed to said station, a power operated feed chain running along said surface, and a pusher lug on said chain engageable with a strap on said feeding surface, and control mechanism comprising switches mounted adjacent said chain along the length thereof for operating said strap shaping elements, and a control lug on said chain for engaging and operating said switches.

6. Apparatus for positioning and shaping a pallet strap for use under a bundle stack of the type having a base layer and upper layers overhanging the sides of said base layer comprising a support structure, a strap channel on said support structure for holding a strap in shaping position, a pair of clamps positioned on said support structure, said clamps being pivotally mounted on said support structure for pivoting movement from a position beneath and beside said channel movable to a position over said channel at positions spaced from each other substantially the width of the bottom layer of a stack, a pair of bending levers pivotally mounted on said support structure one positioned outboard of each of said clamps, said levers being pivotally movable through said channel against a strap therein and toward said clamps, and a pair of bending guides mounted over said channel one positioned outboard of each of said levers.

References Cited by the Examiner

UNITED STATES PATENTS

| | | | |
|---|---|---|---|
| 601,774 | 4/1898 | Fowler | 72—320 |
| 1,740,091 | 12/1929 | Hessenbruch. | |
| 2,185,675 | 1/1940 | Mitchell et al. | 214—8.5 |
| 3,145,757 | 8/1964 | Sheehan | 72—307 |

CHARLES W. LANHAM, *Primary Examiner.*

R. D. GREFE, *Assistant Examiner.*